(12) United States Patent
Hayashi et al.

(10) Patent No.: US 7,140,639 B2
(45) Date of Patent: Nov. 28, 2006

(54) AIRBAG DEVICE

(75) Inventors: Kazutoshi Hayashi, Aichi-ken (JP); Tadashi Yamamoto, Aichi-ken (JP); Takashi Sasaki, Aichi-ken (JP); Yasuo Ochiai, Aichi-ken (JP); Masakazu Tokuda, Himeji (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 245 days.

(21) Appl. No.: 10/950,971

(22) Filed: Sep. 28, 2004

(65) Prior Publication Data

US 2005/0067823 A1    Mar. 31, 2005

(30) Foreign Application Priority Data

Sep. 30, 2003  (JP)  ............................. 2003-339506

(51) Int. Cl.
*B60R 21/26*   (2006.01)
(52) U.S. Cl. .................................................. 280/742
(58) Field of Classification Search ............... 280/742, 280/741, 740, 743.1, 730.2
See application file for complete search history.

(56) References Cited

U.S. PATENT DOCUMENTS

| | | | | |
|---|---|---|---|---|
| 6,224,089 B1 * | 5/2001 | Uchiyama et al. | ....... | 280/728.2 |
| 6,454,299 B1 * | 9/2002 | Whang et al. | ............... | 280/736 |
| 6,485,052 B1 * | 11/2002 | Specht | ........................ | 280/736 |
| 6,749,216 B1 * | 6/2004 | Tanase et al. | ............. | 280/730.2 |
| 6,783,148 B1 * | 8/2004 | Henderson | ................ | 280/728.2 |
| 6,860,506 B1 * | 3/2005 | Ogata et al. | ............. | 280/730.2 |
| 7,040,652 B1 * | 5/2006 | Ogata et al. | ............. | 280/730.2 |

FOREIGN PATENT DOCUMENTS

JP    A-2000-225913    8/2000

* cited by examiner

*Primary Examiner*—Faye M. Fleming
(74) *Attorney, Agent, or Firm*—Posz Law Group, PLC (57) ABSTRACT

In the airbag device of the present invention, a cylinder-shaped inflator includes a discharge side end portion having a plurality of gas discharge ports. The discharge side end is connected with the airbag utilizing a clamp by being inserted into a tubular gas inlet port of the airbag. Each of gas discharge ports includes a circumferential opening and an end face opening. The end face opening emits inflation gas in an axial direction of the inflator when the inflator is connected with the gas inlet port. Between each of the circumferential openings is a supporting plane for supporting an inner surface of the gas inlet port. The discharge side end includes a guide portion for redirecting inflation gas flowing from inside to directions perpendicular to the axis of the inflator when the gas inlet port is not connected with the inflator, such that inflation gas is discharged from the circumferential openings of the gas discharge ports. The airbag of the present invention dispenses with a diffuser and facilitates a connecting work of a cylinder-shaped inflator and an airbag.

7 Claims, 8 Drawing Sheets

AIRBAG DEVICE

The present application claims priority from Japanese Patent Application No. 2003-339506 of Hayashi et al., filed on Sep. 30, 2003, the disclosure of which is hereby incorporated into the present application by reference.

BACKGROUND OF THE INVENTION

1. Field of the Invention

The present invention relates to an airbag device including a cylinder-shaped inflator and an airbag, and more specifically, relates to an airbag device whose inflator is connected with the airbag by having its end portion with gas discharge ports inserted into a tubular inlet port of the airbag.

2. Description of Related Art

Japanese Patent Laid-Open No. 2000-225913 discloses an airbag device in the prior art whose cylinder-shaped inflator is connected with the airbag by having its end portion with gas discharge ports inserted into a tubular inlet port of the airbag.

To secure safety during transportation and so on, in this airbag device, the gas discharge ports are arranged radially in an outer circumference of a discharge side end portion, so that inflation gas is discharged in directions perpendicular to an axial direction of the inflator and thrust force of the inflator (a force to move the inflator) is cancelled, even if inflation gas is unexpectedly discharged from gas discharge ports before the inflator is connected to the airbag.

However, with this construction, the inflator has to be inserted into a tubular inlet port of the airbag to be connected with the airbag so that the gas discharge ports on the outer circumference of the end portion may not be closed. In this relation, conventionally, a bottomed cylindrical diffuser is connected to the inflator end portion having the gas discharge ports. The diffuser is provided on its end face with gas outlet ports, and is covered over the gas discharge ports of the inflator for redirecting inflation gas discharged from the discharge ports to flow along the axial direction of the inflator. Thus inflation gas discharged from the gas discharge ports of the inflator is redirected within the diffuser and flows out of the end face of the diffuser along the axial direction of the inflator.

Accordingly, it was necessary in an airbag device in the prior art to connect a diffuser to an inflator before connecting the inflator to an airbag, and after such a work, to connect the inflator to the airbag by covering the diffuser with a gas inlet port of the airbag and fasten it by a clamp, which increased assembling processes of the airbag device.

SUMMARY OF THE INVENTION

The present invention contemplates to solve the above-mentioned problem, and has an object to provide an airbag device which dispenses with a diffuser and facilitates a connecting work of a cylinder-shaped inflator and an airbag.

The airbag device according to the present invention includes an airbag, a cylinder-shaped inflator, and a clamp. The airbag includes a tubular gas inlet port. The inflator includes a discharge side end portion to be inserted into the gas inlet port when connected with the airbag. The discharge side end includes a plurality of gas discharge ports for supplying inflation gas to the airbag. Each of the gas discharge ports includes a circumferential opening located in an outer circumference of the discharge side end, and an end face opening continued from the circumferential opening and located in an end face of the discharge side end. Between each of the circumferential openings are supporting planes extending up to the end face of the discharge side end for supporting an inner surface of the gas inlet port of the airbag. The discharge side end further includes a guide portion for redirecting inflation gas flowing along an axial direction of the inflator to directions perpendicular to the axis of the inflator inside the discharge side end when the gas inlet port of the airbag is not connected with the inflator, and thus inflation gas is discharged from the circumferential openings of the gas discharge ports. The clamp is clamped over the discharge side end sheathed with the gas inlet port to reduce its inner diameter, such that the gas inlet port is pressed onto the supporting planes of the discharge side end, and the gas inlet port of the airbag is connected with the discharge side end. Thus, after the airbag is connected with the inflator, the circumferential openings are closed by the gas inlet port of the airbag and inflation gas is discharged from the end face openings in the axial direction of the inflator.

In the airbag device of the present invention, the airbag is connected with the inflator by inserting the discharge side end of the inflator into the gas inlet port of the airbag, and by clamping the gas inlet port on the discharge side end with the clamp to press the inner surface of the gas inlet port onto the supporting planes. After the connecting work, if the inflator is actuated, inflation gas is generated. Since the circumferential openings of the gas discharge ports are closed by the inner surface of the gas inlet port of the airbag, even if the discharge side end of the inflator includes the guide portion for directing inflation gas toward directions perpendicular to the axis of the inflator, inflation gas is discharged from the end face openings of the gas discharge ports, and flows into the airbag smoothly along the axial direction of the inflator, or the axial direction of the gas inlet port, without utilizing a diffuser.

Before the airbag is connected to the inflator, the circumferential openings of the discharge ports are not closed by the inner surface of the gas inlet port of the airbag. Accordingly, even if the inflator unexpectedly discharges inflation gas from the discharge ports, because of a guide by the guide portion, inflation gas is discharged from the circumferential openings of the gas discharge ports in directions perpendicular to the axis of the inflator. Therefore, thrust force is not applied to the inflator.

Therefore, the airbag device according to the present invention facilitates a connecting work of the airbag and the inflator by dispensing a diffuser but using only a clamp. Moreover, even if the inflator is actuated before the airbag is connected to the inflator, thrust force is not applied to the inflator.

It is desired that each of the supporting planes in the discharge side end is provided in its circumferential portion proximate to an end face of the discharge side end with a raised portion raised in a direction perpendicular to the axis of the inflator and that the clamp is located inward of and close to the raised portion in the axial direction of the inflator.

With this construction, the raised portion prevents the clamp from slipping off the inflator, which improves a connecting strength of the airbag and the inflator.

When the clamp includes a belt portion whose inner diameter is to be reduced, it is desired that the inflator includes a projection in a circumferential portion of the discharge side end apart from the raised portion substantially by a width of the belt portion, such that a recessed portion is provided between the raised portion and the projection which the belt portion fits in when clamped over the discharge side end sheathed with the gas inlet port.

With this construction, the clamp hardly moves in front or rear direction in the axial direction of the inflator, which further improves the connecting strength of the airbag and the inflator.

The guide portion of the inflator may includes a columnar main body, a ceiling wall, grooves and through holes, for example. The main body includes a gas passage for inflation gas to flow therethrough along the axial direction of the inflator. The ceiling wall closes the gas passage in downstream of inflation gas. The grooves are arranged radially in a circumference of the guide portion close to the ceiling wall, and recessed up to the vicinity of the gas passage and extend to the end face of the discharge side end. The through holes are located in each bottom of the grooves and away from the ceiling wall, and formed through to the gas passage in directions perpendicular to the axis of the inflator, such that inflation gas is discharged therefrom to directions perpendicular to the axis of the inflator Each of the grooves constitutes a gas discharge port, and includes the circumferential opening located in the outer circumference of the discharge side end, and the end face opening continued from the circumferential opening and located in the end face of the discharge side end.

With this construction, when the inflator includes a housing located upstream of inflation gas than the guide portion, the guide portion is desirably fixed to the housing.

The guide portion may be a single part made of a metal block, or may be made of two parts. The two parts desirably consist of a top end portion having grooves and a base portion located proximate to the housing and connected with the top end portion, because it is easy to form the gas passage, the grooves and the through holes.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

FIGS. 1 to 4 illustrate an embodiment of the airbag device M of the present invention. The airbag device M is a head-protecting airbag device located above side windows of a vehicle, and includes an airbag 1 and an inflator 4. The airbag 1 is housed above side windows inside the vehicle in a folded state, while the inflator 4 is secured to vehicle body above side windows inside the vehicle.

Figure 1:
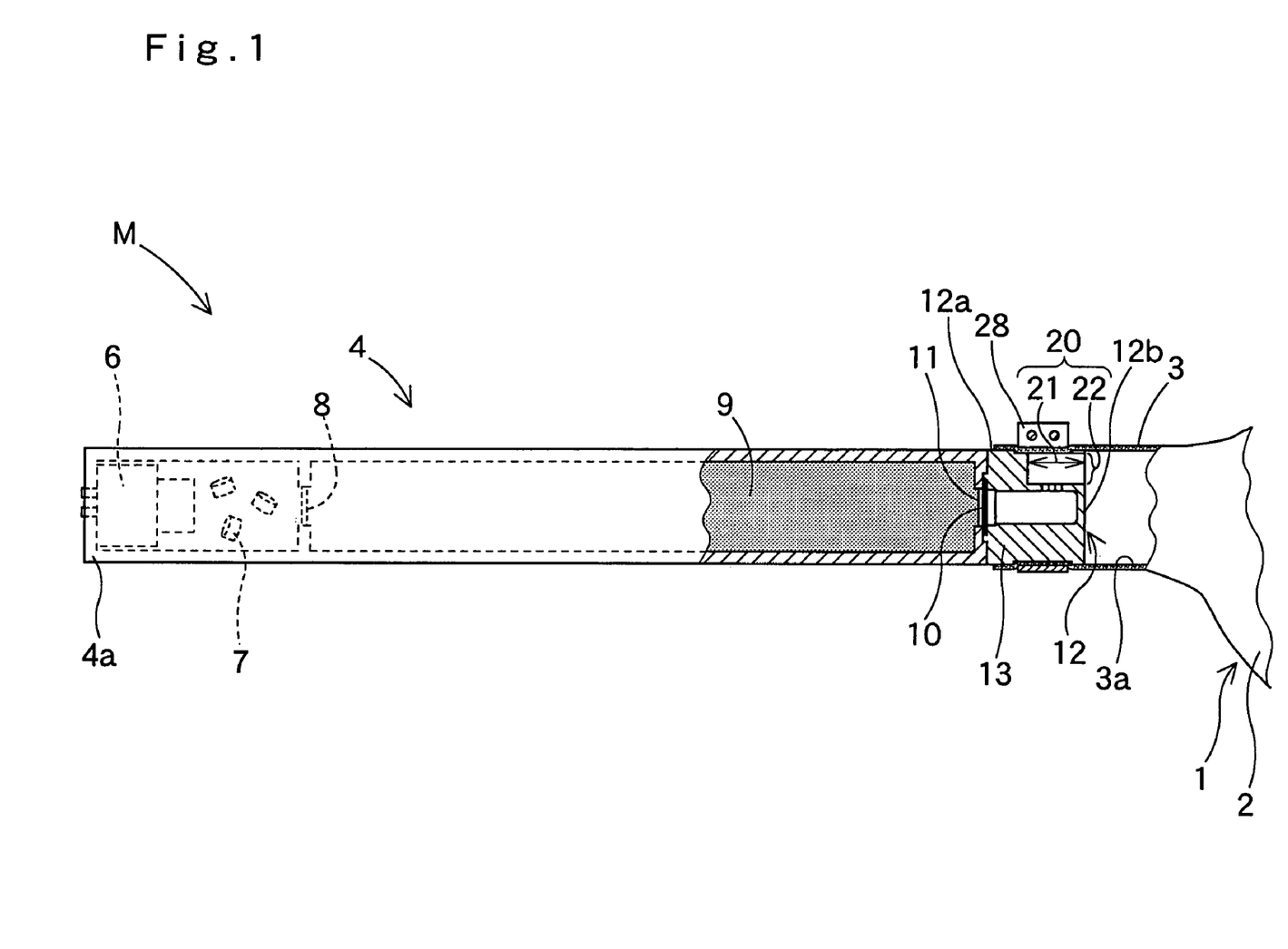
FIG. 1 illustrates a connecting condition of an airbag and an inflator in an embodiment of the airbag device of the present invention.

The airbag 1 includes an airbag body 2 which is inflatable to cover side windows when fed with inflation gas G from the inflator 4, and a tubular gas inlet port 3 for introducing inflation gas G into the airbag body 2. An inner diameter of the gas inlet port 3 is slightly greater than an outer diameter of an end portion 12 of the inflator where gas discharge ports 20 are arranged (as will be called a discharge side end 12).

The inflator 4 has a cylindrical shape and is provided with a plurality of gas discharge ports 20. In the foregoing embodiment, six gas discharge ports 20 are arranged. As shown in FIG. 1, the inflator 4 is provided at the other end portion 4a apart from the discharge side end 12 with an initiator 6 for ignition in response to actuating signals. Inflation gas G is generated by combustion of gas generating agent 7 triggered by ignition of the initiator 6, and inflation gas G thus generated is injected from an injection port 11 together with compressed air 9 filled in a housing 5 by breaking a burst disc 8, and then breaking a burst disc 10. Then inflation gas G is discharged from the individual gas discharge ports 20 via a gas passage 15 located within the discharge side end 12.

Figure 2:
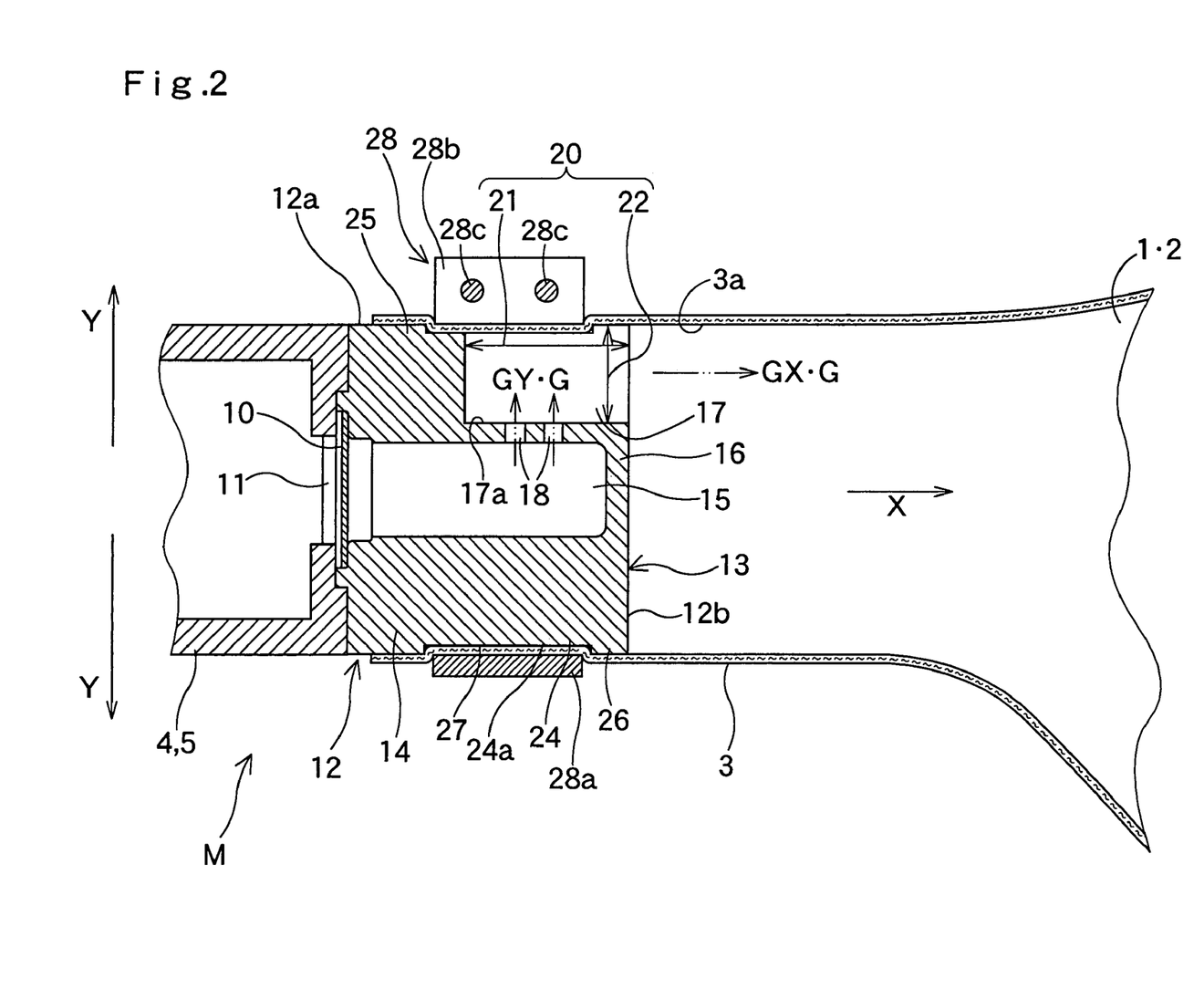
FIG. 2 is an enlarged section of a connecting portion of the airbag and the inflator of FIG. 1, taken along line II—II in FIG. 3.
Figure 3:
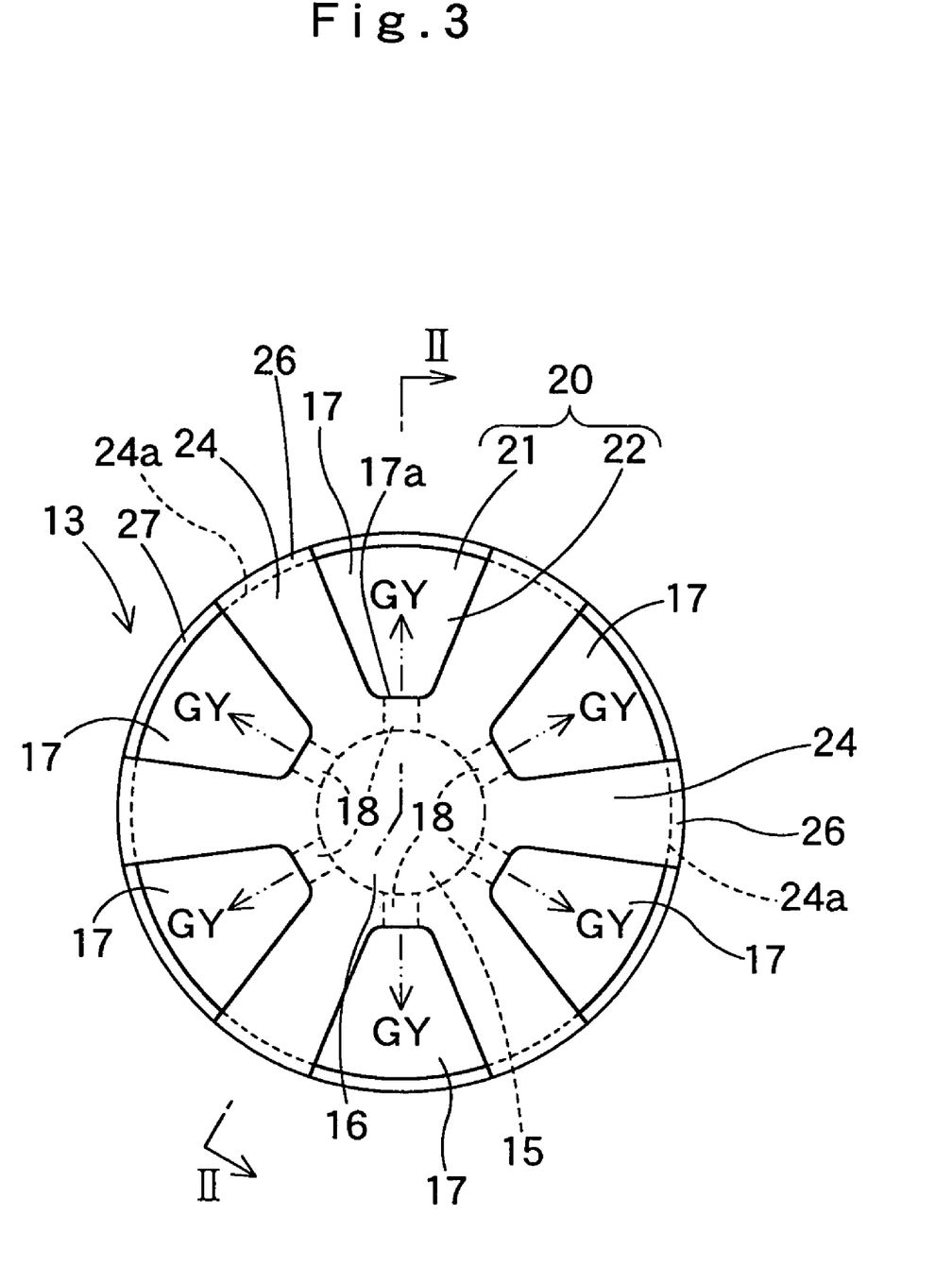
FIG. 3 illustrates a discharge side end of the inflator of FIG. 1, as viewed from a side of an end face thereof.
Figure 4:
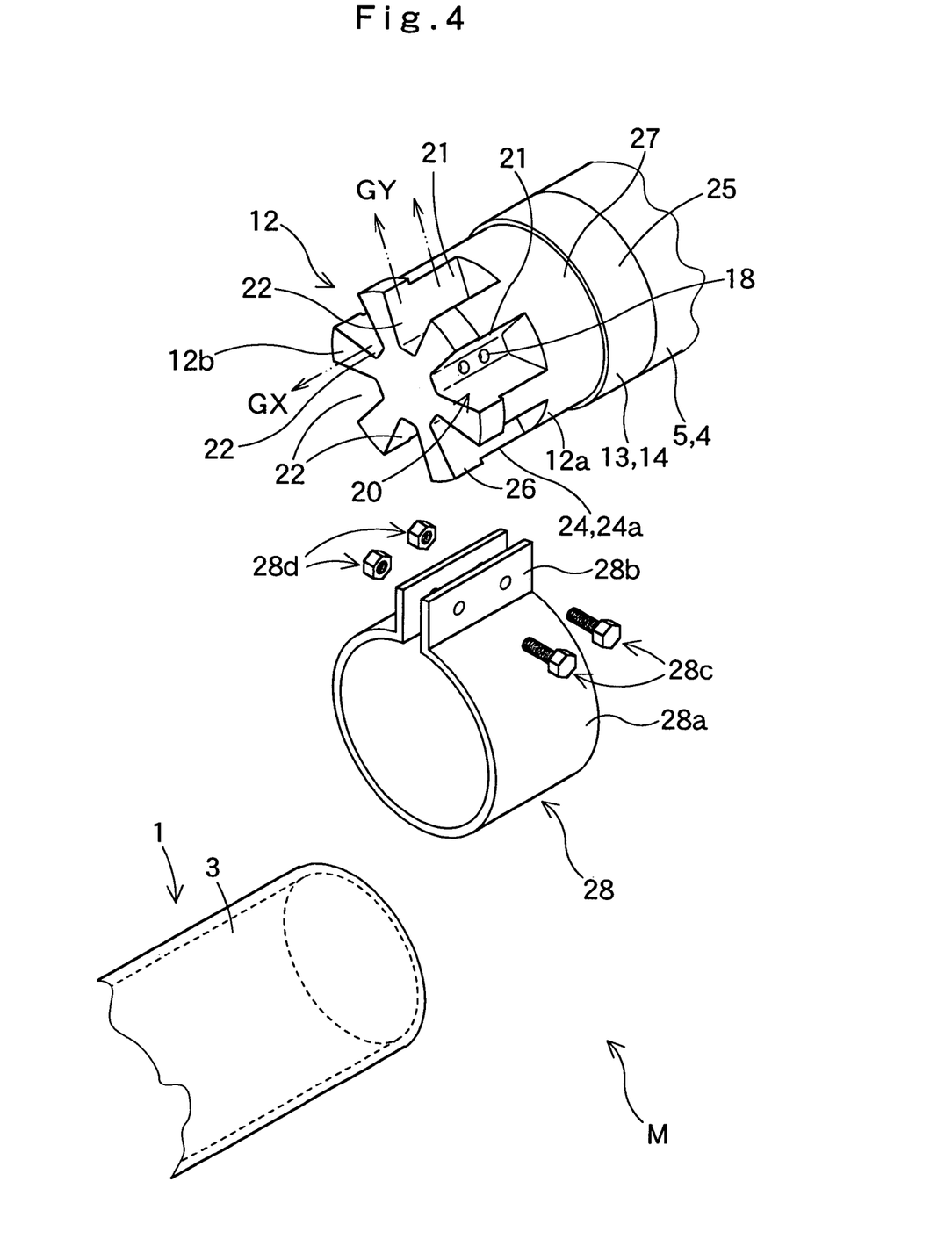
FIG. 4 is a partial perspective view of individual parts of the embodiment.

As best shown in FIGS. 2 and 3, the discharge side end 12 of the inflator 4 includes a guide portion 13 fixed to the housing 5 of the inflator 4. The guide portion 13 is provided inside its columnar main body 14 with a gas passage 15 for inflation gas G from the injection port 11 to flow through along the axial direction X of the inflator 4, and is also provided in downstream of the gas passage 15 with a ceiling wall 16 confronting the injection port 11. The guide portion 13 is further provided in its outer circumference close to the ceiling wall 16 with six grooves 17. The grooves 17 are arranged radially and extend to an end face 12b of the guide portion 13. Each of the grooves 17 is recessed up to the vicinity of the gas passage 15, and in each of bottoms 17a of the grooves 17 are two through holes 18. Each of the through holes 18 is located away from the ceiling wall 16, and formed through to the gas passage 15 in a direction Y perpendicular to the axis of the inflator 4.

With this guide portion 13, inflation gas G injected from the injection port 11 abuts against the ceiling wall 16, and is all discharged into each of the grooves 17 via the through holes 18 as inflation gas GY discharged in directions Y perpendicular to the axis of the inflator 4.

The gas discharge ports 20 are constituted by the grooves 17 of the guide portion 13. As constituent parts, each of the gas discharge ports 20 includes a circumferential opening 21 located in the outer circumference 12a of the discharge side end 12, and an end face opening 22 continued from the circumferential opening 21 and located in the end face 12b of the discharge side end 12.

Between each of the circumferential openings 21 in the outer circumference 12a, or between each of the grooves 17 in the guide portion 13 is a supporting plane 24 for supporting an inner surface 3a of the gas inlet port 3 of the airbag 1 intermittently and partially. Each of the supporting planes 24 extends up to the end face 12b of the discharge side end 12.

Each of the supporting planes 24 is provided proximate to the end face, i.e., in a circumferential portion 12a of the discharge side end 12 proximate to the end face with a raised portion 26 raised in a direction Y perpendicular to the axis of the inflator 4.

A clamp 28 used to connect the airbag 1 and the inflator 4 is a normal type, and includes an annular belt portion 28a and two flanges 28b located at both ends of the belt portion 28a. The flanges 28b are brought close to each other by bolts 28c and nuts 28d to reduce an inner diameter of the belt portion 28a.

In the foregoing embodiment, the discharge side end 12 of the inflator 4 is provided in a circumferential portion apart from the raised portion 26 with a projection 25 formed along circumferential direction, so that a recessed portion 27 is provided between the raised portion 26 and the projection 25 in each of the supporting planes 24. A width of the belt portion 28a of the clamp 28 is so predetermined that the belt portion 28a fits in the recessed portion 27 in a condition that the gas inlet port 3 of the airbag 1 covers over the recessed portion 27.

In the airbag device M, the airbag 1 is connected with the inflator 4 by inserting the discharge side end 12 of the inflator 4 into the gas inlet port 3 of the airbag 1, and by clamping the gas inlet port 3 on the discharge side end 12 with the clamp 28 to press the inner surface 3a of the gas inlet port 3 onto outer circumferences 24a of the supporting planes 24.

After the connecting work, if the inflator 4 is actuated, inflation gas G is generated. Since the circumferential openings 21 of the gas discharge ports 20 are closed by the inner surface 3a of the gas inlet port 3 of the airbag 1, even if the discharge side end 12 of the inflator 4 includes the guide portion 13 for directing inflation gas G toward directions Y perpendicular to the axis of the inflator 4, inflation gas G is discharged from the end face openings 22 of the gas discharge ports 20, as gas GX flowing along the axial direction X of the inflator 4, or the axial direction of the gas inlet port 3, and then flows into an airbag body 2 smoothly.

Before the airbag 1 is connected to the inflator 4, the circumferential openings 21 of the discharge ports 20 are not closed by the inner surface 3a of the gas inlet port 3 of the airbag 1. Accordingly, even if the inflator 4 unexpectedly discharges inflation gas G from the discharge ports 20, inflation gas G is guided by the guide portion 13 and discharged from the circumferential openings 21 of the gas discharge ports 20 as gas GY flowing along directions Y perpendicular to the axis of the inflator 4. Therefore, thrust force is not applied to the inflator 4.

Therefore, the airbag device M according to the present invention facilitates a connecting work of the airbag 1 and the inflator 4 by dispensing a diffuser but using only a clamp 28. Moreover, even if the inflator 4 is actuated before the airbag 1 is connected to the inflator 4, thrust force is not applied to the inflator 4.

In the foregoing embodiment, each of the supporting planes 24 in the discharge side end 12 of the inflator 4 is provided proximate to the end face, i.e., in a circumferential portion 12a of the discharge side end 12 proximate to the end face with a raised portion 26 raised in a direction Y perpendicular to the axis of the inflator 4, and the clamp 28 is located inward of and close to the raised portion 26 in the axial direction X of the inflator 4 when the inlet port 3 of the airbag 1 is connected to the inflator 4. Accordingly, the raised portion 26 prevents the clamp 28 from slipping off from the inflator 4, which improves a connecting strength of the airbag 1 and the inflator 4.

Since the belt portion 28a of the clamp 28 fits in the recessed portion 27 having the gas inlet port 3 interposed between itself and the inflator 4, especially, the clamp 28 hardly moves in front or rear direction in the axial direction of the inflator 4. Accordingly, the connecting strength of the airbag 1 and the inflator 4 is further improved.

Although the foregoing embodiment shows the raised portion 26 as a projection formed in an outer circumference of each of the supporting planes 24, the raised portion 26 may be formed of a diverging plane which diverges toward the end face 12b.

Figure 5:
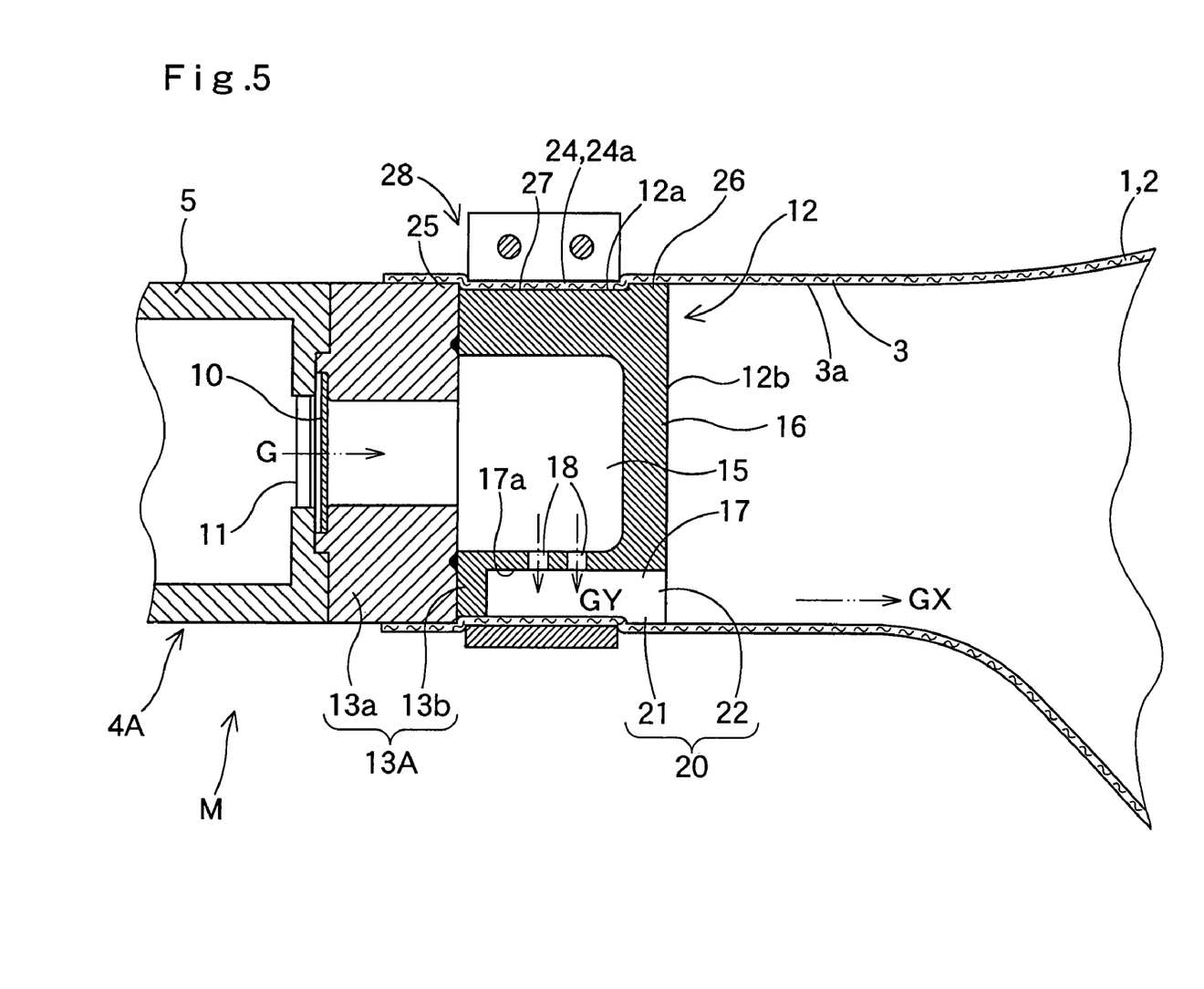
FIG. 5 is an enlarged section of a connecting portion of an airbag and an inflator in another embodiment, which corresponds to V—V of FIG. 6.
Figure 6:
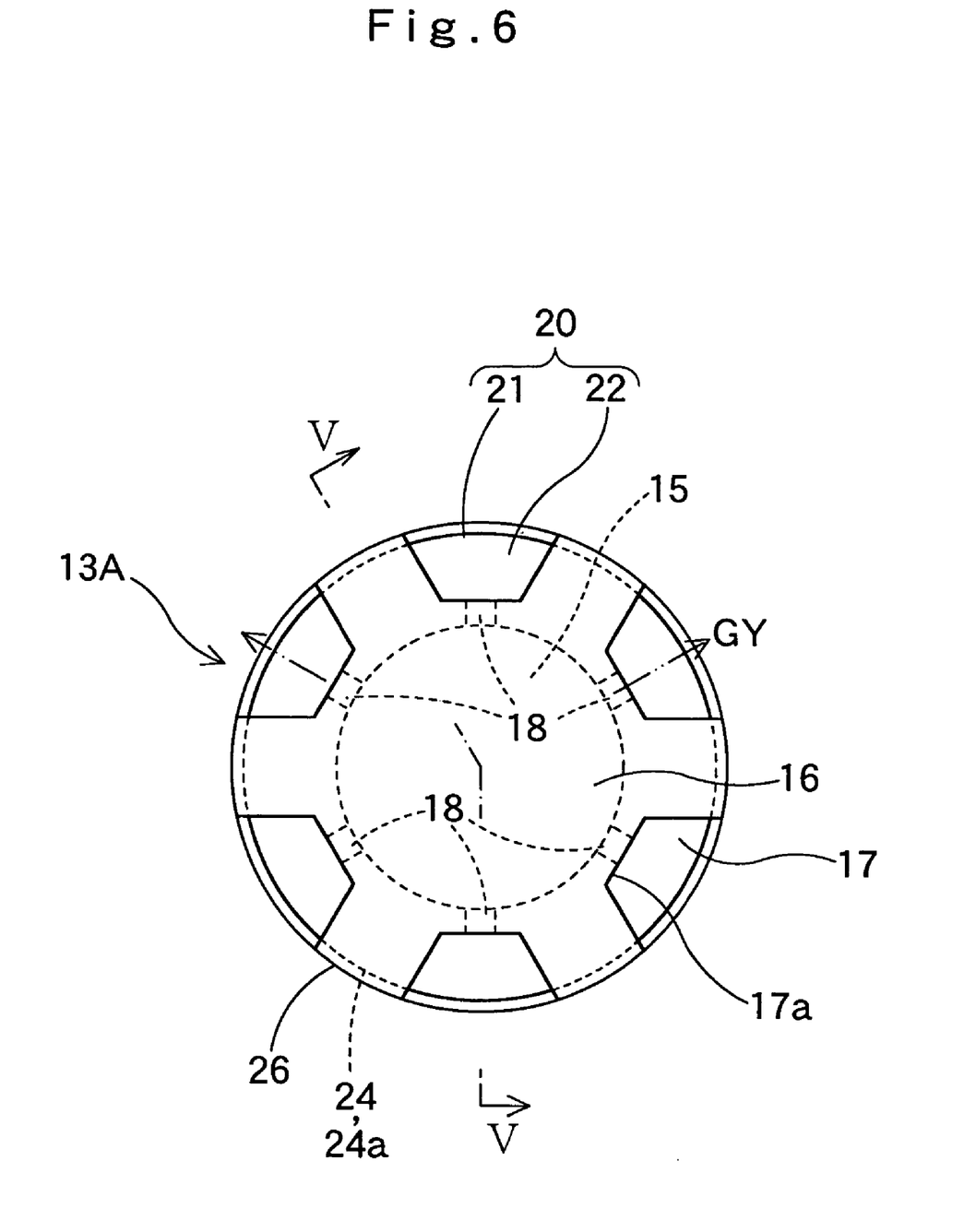
FIG. 6 illustrates a discharge side end of the inflator of FIG. 5, as viewed from a side of an end face thereof.

Although the foregoing embodiment shows the guide portion 13 being a single part formed by cutting a metal block or the like, the guide portion may be formed more simply as a guide portion 13A of an inflator 4A shown in FIGS. 5 and 6, which is formed of two parts, a base portion 13a fixed to the housing 5 and a top end portion 13b having grooves 17, welded or the like to each other.

Figure 7:
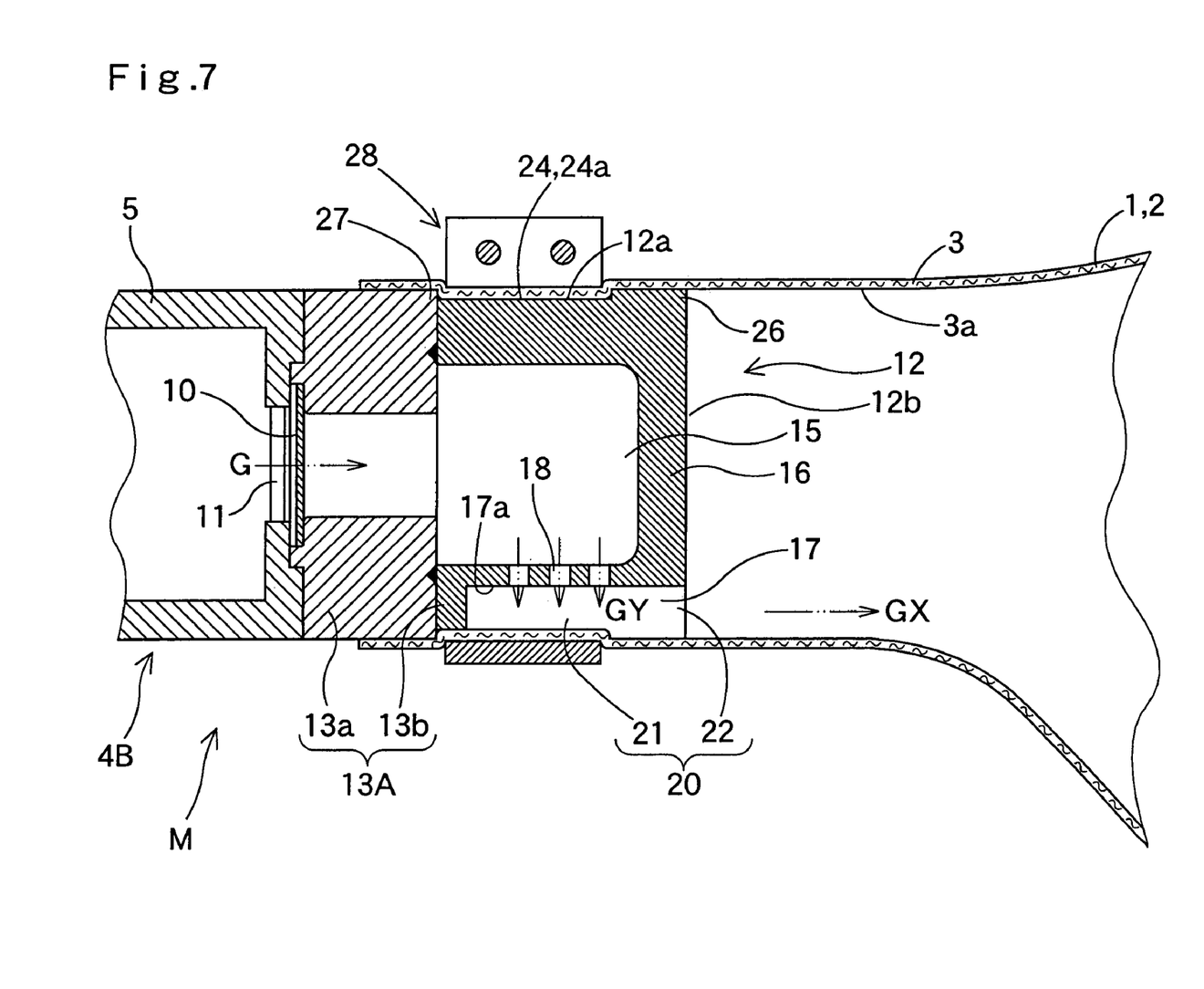
FIG. 7 is an enlarged section of a connecting portion of an airbag and an inflator in yet another embodiment, which corresponds to VII—VII of FIG. 8.
Figure 8:
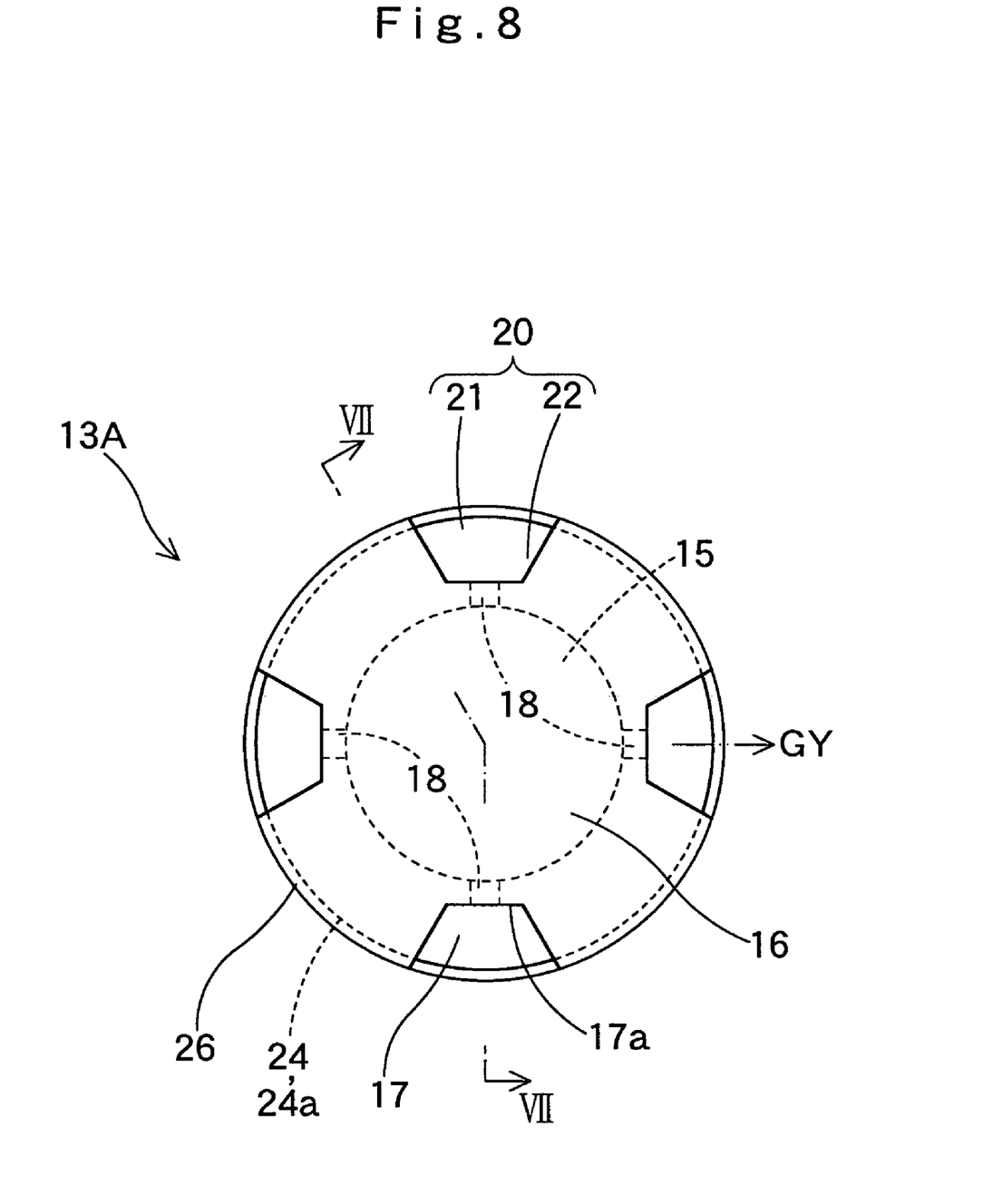
FIG. 8 illustrates a discharge side end of the inflator of FIG. 7, as viewed from a side of an end face thereof.

Although the foregoing embodiment includes six gas discharge ports 20, four ports may work as in an inflator 4B shown in FIGS. 7 and 8, as long as they are arranged radially. Number of the gas discharge ports 20 should not be limited if the object of the present invention is achieved. For example, the number may be determined within a range of 3 to 8. Number of the through holes 18, either, should not be limited to that shown in the foregoing embodiment. In addition, a shape of the through hole 18 should not be limited to a round shape in the illustrated embodiment, but may be of a rectangular shape, for example. Moreover, although a bottom plane 17a having the through holes 18 is shown as a flat plane, it may be an arcuate plane, for example. Furthermore, with respect to the grooves 17 serving as the gas discharge ports 20, too, its width in the circumferential direction, its length in the axial direction in the outer circumference 12a of the end portion 12, and its depth should not be limited to the illustrated embodiments.

The inflator 4 in the foregoing embodiments controls a flow rate of inflation gas supplied to the airbag 1 by the through holes 18. Accordingly, a total opening area of the through holes 18 is predetermined smaller than that of the gas discharge ports 20. Here, the total opening area of the gas discharge ports 20 refers to a grand total of sectional areas of the end face openings 22 in a radius direction (in FIG. 3, a grand total of those of six end face openings 22). Of course, the flow rate of inflation gas supplied to the airbag 1 may be controlled by other means than the through holes 18.

Although the foregoing embodiments are described as applied to an airbag device for head-protection, it is not intended to be limited thereby. On condition that the airbag includes a tubular gas inlet port and is to be connected at the inlet port with a cylinder-shaped inflator, the foregoing embodiments may be applied to an airbag device for seat for protecting occupant's abdomen and breast, an airbag device for pedestrian-protection mounted in a front part of vehicle, an airbag device for driver's seat, an airbag device for front passenger's seat, and an air belt and so on.

What is claimed is:

1. An airbag device comprising:
   an airbag having a tubular gas inlet port;
   a cylinder-shaped inflator including a discharge side end portion to be inserted into the gas inlet port of the airbag when connected with the airbag; and
   a clamp whose inner diameter is reduced for connecting the gas inlet port of the airbag with the discharge side end of the inflator, wherein:
   the discharge side end of the inflator includes:
      a plurality of gas discharge ports, each of the gas discharge ports including a circumferential opening located in an outer circumference of the discharge side end, and an end face opening continued from the circumferential opening and located in an end face of the discharge side end;

supporting planes located between the circumferential openings for supporting an inner surface of the gas inlet port of the airbag, each of the supporting planes extending up to the end face of the discharge side end; and a guide portion for redirecting inflation gas flowing along an axial direction of the inflator to directions perpendicular to the axis of the inflator inside the discharge side end when the gas inlet port of the airbag is not connected with the inflator, such that inflation gas is discharged from the circumferential openings of the gas discharge ports, and the clamp is clamped over the discharge side end sheathed with the gas inlet port, such that the gas inlet port is pressed onto the supporting planes of the discharge side end, whereby, after the airbag is connected with the inflator, the circumferential openings are closed by the gas inlet port of the airbag and inflation gas is discharged from the end face openings in the axial direction of the inflator.

2. An airbag device according to claim 1, wherein:

each of the supporting planes in the discharge side end is provided in a circumferential portion thereof proximate to an end face of the discharge side end with a raised portion raised in a direction perpendicular to the axis of the inflator; and the clamp is located inward of and close to the raised portion in the axial direction of the inflator.

3. An airbag device according to claim 2, wherein:

the clamp includes a belt portion whose inner diameter is to be reduced; and the inflator includes a projection in a circumferential portion of the discharge side end apart from the raised portion substantially by a width of the belt portion, whereby a recessed portion is provided between the raised portion and the projection which the belt portion fits in when clamped over the discharge side end sheathed with the gas inlet port.

4. An airbag device according to claim 1, wherein:

the guide portion of the inflator comprises:

a columnar main body having a gas passage for inflation gas to flow therethrough along the axial direction of the inflator;

a ceiling wall closing the gas passage in downstream of inflation gas;

a plurality of grooves arranged radially in a circumference of the guide portion to the ceiling wall, each of the grooves being recessed up to the vicinity of the gas passage and extending to the end face of the discharge side end; and a through hole located in each bottom of the grooves and away from the ceiling wall, the hole being formed through to the gas passage in a direction perpendicular to the axis of the inflator, such that inflation gas is discharged therefrom to the direction perpendicular to the axis of the inflator, and each of the grooves constitutes the gas discharge port.

5. An airbag device according to claim 4, wherein:

the inflator includes a housing located upstream of inflation gas than the guide portion; and the guide portion is fixed to the housing.

6. An airbag device according to claim 5, wherein the guide portion is a single part made of a metal block.

7. An airbag device according to claim 5, wherein the guide portion consists of a top end portion having grooves and a base portion located proximate to the housing and connected with the top end portion.

* * * * *